Nov. 20, 1951  P. P. GLASSEY  2,575,805
TRIPOD GUN MOUNT
Filed Feb. 8, 1945  4 Sheets-Sheet 1
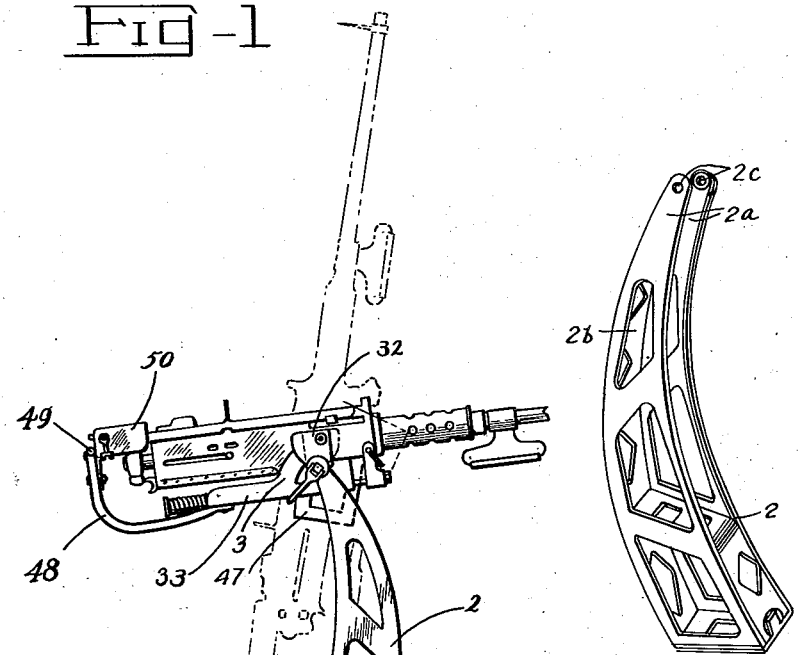
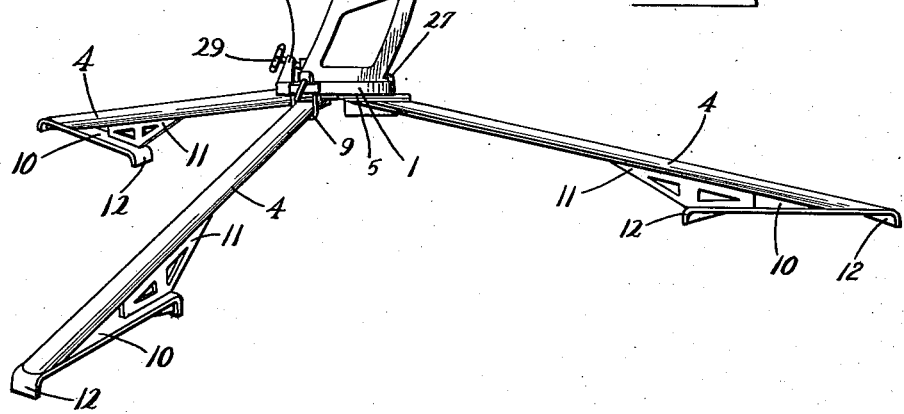
INVENTOR.
PHILIP P. GLASSEY
BY C. E. Herrstrom +
H. E. Thibodeau
ATTORNEYS Nov. 20, 1951    P. P. GLASSEY    2,575,805
TRIPOD GUN MOUNT
Filed Feb. 8, 1945    4 Sheets-Sheet 2
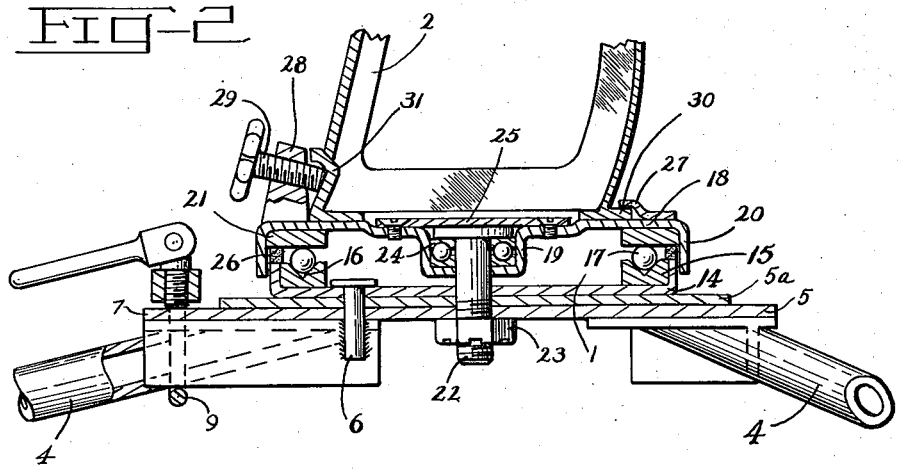
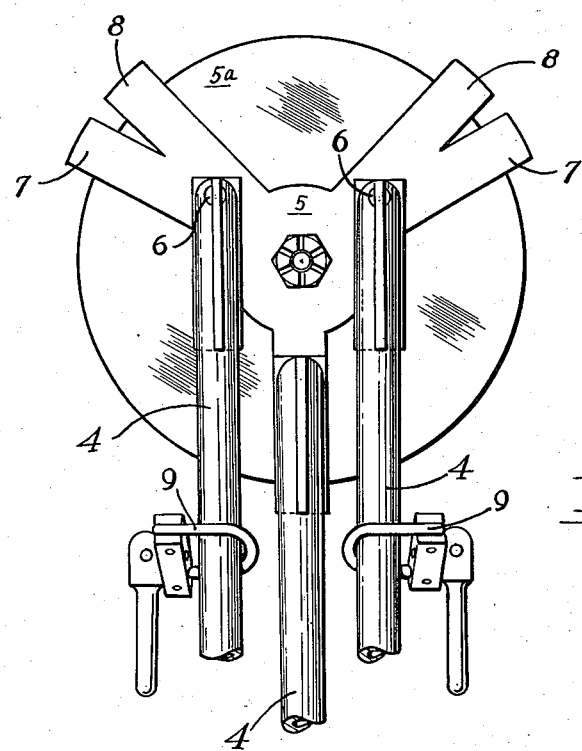
INVENTOR.
PHILIP P. GLASSEY
BY
ATTORNEYS

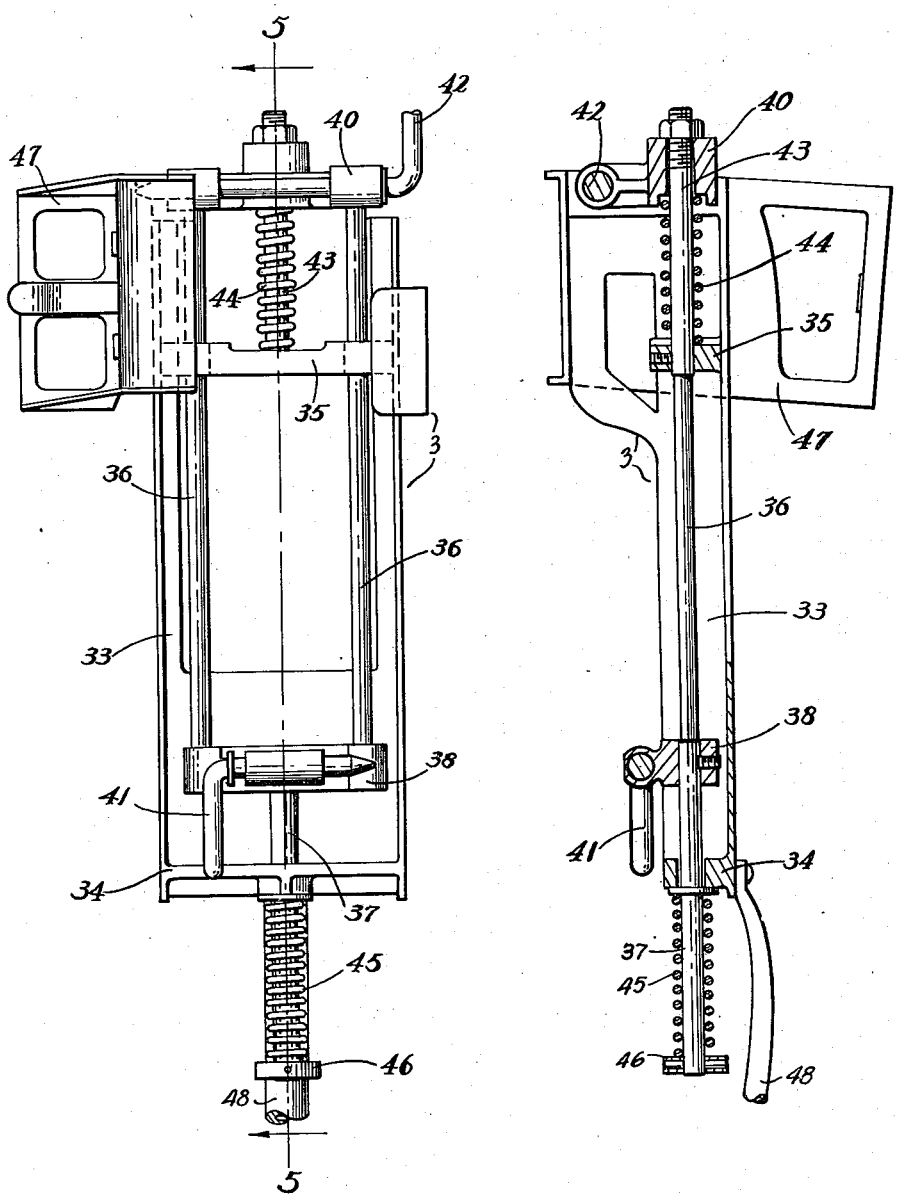

Nov. 20, 1951 — P. P. GLASSEY — 2,575,805
TRIPOD GUN MOUNT
Filed Feb. 8, 1945 — 4 Sheets-Sheet 4
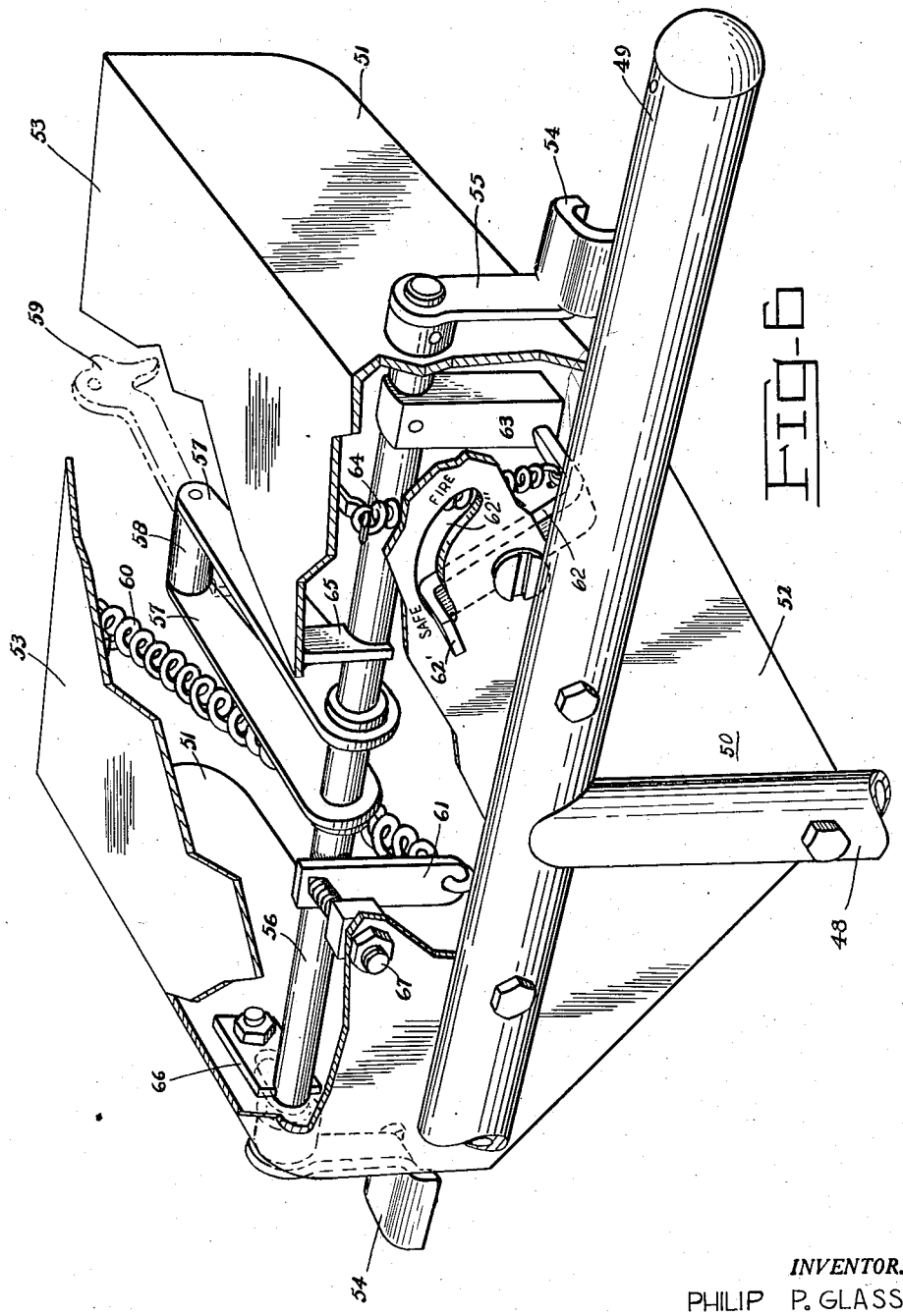
INVENTOR.
PHILIP P. GLASSEY
BY C. E. Herrstrom &
H. E. Thibodeau
ATTORNEYS Patented Nov. 20, 1951

2,575,805

UNITED STATES PATENT OFFICE 2,575,805

TRIPOD GUN MOUNT

Philip P. Glassey, Cazenovia, N. Y., assignor to Easy Washing Machine Corporation, Syracuse, N. Y., a corporation of Delaware Application February 8, 1945, Serial No. 576,857

2 Claims. (Cl. 89—40)

The present invention relates generally to a gun mount suitable for use with automatic, rapid-fire weapons such, for example, as the .30 and .50 caliber machine guns used by the United States Army.

An object of this invention is to provide a lightweight mount which can, if necessary, be carried by one man and which is readily broken down into several light assemblies so that it may be rapidly carried for long distances by several men.

A further object of this invention is to provide a mount in which the center line of the bore of the gun may be approximately 60 inches off the ground so that the gun mounted on it may be readily fired by a man in the standing position.

Another object is to provide a mount of reasonable accuracy and which is stable in its action and which is able to achieve such stability and accuracy without the use of sandbags, stakes or other devices to steady the mount.

Another object of this invention is to provide a machine gun mount having a simple recoil device.

A further object of this invention is to provide a mount which can readily be swung in a full 360° traverse and which also permits an elevation range of from below the horizontal to substantially vertical.

A further object of this invention is to provide a mount which can be readily manufactured without the use of critical materials, which contains a small number of components and which has few critical tolerances in manufacture. Likewise, it is an object of this invention to provide a mount which is foolproof in operation and easy to maintain.

Another object of this invention is to provide a machine gun mount which lends itself either to use on the ground, or on vehicles and which can quickly and easily be set up and placed in firing condition.

In general, the above objects are accomplished by providing a mount consisting of two main assemblies readily erected in the field, comprising a low-lying tripod base assembly containing a ball bearing turntable, and a gun supporting assembly incorporating a flexible carriage section preferably made of steel stampings and a cradle section which may contain a recoil mechanism.

A preferred embodiment of the invention is illustrated in the accompanying drawings wherein:

Figure 1 is a view in side elevation of a gun mount constructed in accordance with one embodiment of the invention, showing the gun in horizontal and elevated positions in solid and broken lines respectively;

Figure 2 is a cross section of the central portion of the base member designated 1 in Figure 1;

Figure 3 is a bottom view of the central portion of the base member designated 1 in Figure 1;

Figure 4 is a plan view of the cradle member numbered 3 in Figure 1;

Figure 5 is a cross section on the line 5—5 of Figure 4;

Figure 6 is a perspective view of the trigger actuating mechanism with the cover broken away to illustrate the relation and operation of the interior parts; and Figure 7 is a perspective view of the carriage member per se.

Similar numerals refer to similar parts throughout the several views.

As illustrated in Figure 1 the gun mount consists generally of a base member 1, a carriage member 2 and a cradle member 3.

The base member 1 is provided with three legs 4 preferably made of tubular steel. The legs are of such length and disposed at such an angle to the base member that the central portion of the base member is relatively close to the ground. In one practical embodiment of the invention, it was found advantageous to have the legs about 60 inches long and set at such an angle that the center of the base was about 10 inches off the ground. In this manner, the maximum base area is obtained, achieving satisfactory stability and at the same time the legs are out of the way so that the gunner may train the gun in any position. One of the legs 4 is rigidly fastened, as by welding, to a spider 5 which in turn is welded to a plate 5a at the under side of the base. The other two legs are provided with pivots 6, so that two of the legs may be swung laterally and placed side by side with the rigid leg when the mount is transported. Two pairs of metal lugs 7 and 8 are provided as projections of the spider 5 so that the pivoted legs may be clamped into position by clamps 9. Lugs 7 are each about 120° from the fixed leg and the pivoted legs are clamped on these lugs when the mount is to be used on the ground, as this position gives equal support in all directions and thus achieves maximum stability. Lugs 8 are each located about 140° from the fixed leg, and the pivoted legs are clamped on these projections when it is desired to set up the mount in a restricted space such as the body of a truck. The outward ends of legs 4 are provided with feet members 10. These members lie parallel with the ground and serve to distribute the weight of the mount over a considerable area and thus prevent the legs from sinking into the ground. The feet are provided with braces 11 to secure rigidity. Spades 12 are provided on the feet so that if the mount is used on soft ground they will sink slightly into the ground and tend to prevent movement of the base. It can readily be seen that the legs are so disposed that sandbags or other anchoring means may readily be used when the mount is to be located in one position for an extended period.

As is shown in Figure 2, the base member has a ball bearing turntable. The bearing comprises a circular dished portion 14 carried by the plate 5a and within which the annular lower ball race 15 is loosely fitted. The ball race 15 has a V groove 16 in the upper surface arranged to receive the balls 17. The upper portion of turntable 18 of the bearing comprises a circular dished member having a central circular depression 19. The turntable 18 is made slightly larger in diameter than the base portion 14 so that the lip 20 surrounds and projects downwardly over the rim of the base portion 14. A flat annular ball race 21 is loosely fitted in the turntable and when assembled rests on the balls 17. The bearing is held together by means of central bolt 22 and castellated nut 23. In the preferred form, the castellated nut 23 is welded to the spider 5. A ball thrust bearing 24 is inserted in the depression 19 in the turntable 18. Bolt 22 is inserted through the ball thrust bearing 24 and screwed into the castellated nut 23. When bolt 22 is tightened, it preloads both the thrust bearing 24 and the main thrust bearing comprising the races 15 and 21 and the balls 17. The bolt 22 is isolated through the thrust bearing 24 from the turntable 18. By this means the main thrust bearing is preloaded through antifriction devices. In the preferred form, cover plate 25 is secured by screws or other means to the turntable 18 and is primarily for the purpose of excluding foreign matter from the thrust bearing 24. A ring 26 formed of felt or other suitable material located around the periphery of the base portion 14 may be provided to seal the main thrust bearing and prevent the entry of foreign matter to the ball race 16.

One important advantage of this type of bearing is that by means of the bolt 22 and nut 23 it may be preloaded to any desired degree while still allowing free rotation. A further advantage of this type of construction is that one V-race and one flat race may be used, thus eliminating the necessity for exact concentricity of two V-races as ordinarily employed. Any misalignment of the upper race with the lower race is immaterial as the balls are free to move laterally of the flat race in any event. It has been found in practice that this type of bearing is very easy to construct commercially and can be constructed very cheaply as compared to the conventional type of ball thrust bearings utilizing concentric V-races or U-races. Furthermore, with the preloading arrangement, an off-center load may be imposed upon the bearing without materially affecting its function. It has also been found that a gun mount embodying this type of bearing allows traversing of the gun with great facility and that substantially all shake can be removed from the bearing, thus increasing the accuracy of the mount.

The turntable 18 has, near one edge, an upturned lug 27 and at the opposite edge has a projection 28 containing an angularly directed setscrew 29, which provide means for fastening the carriage member 2 to the base member 1. In use, a small projection 30 on the carriage member is placed under lug 27 and the setscrew 29 is tightened into a depression 31 of the carriage 2. In this manner, the carriage and base members may be rigidly joined, yet may be rapidly disassembled for transportation.

The carriage member 2 functions as a pedestal, and in the embodiment illustrated comprises a single fabricated post-like member having a generally arcuate shape preferably made of pressed sheet metal sections. The carriage is substantially square in cross section at the base. The width is substantially constant throughout its height but the fore-and-aft depth decreases towards the top. The rear part (i. e., the portion to the rear of the gun) is cut away towards the upper portion of the carriage, leaving two side webs 2a and a front cross web 2b so that the upper portion of the carriage is substantially U-shaped in cross section so that the gun cradle 3 may be pivoted therein. As the gun is elevated, the cradle goes into the hollow portion of the U. Thus, by making the carriage in arcuate shape with a U cross section of the upper portion of the carriage, a mount is provided which allows extreme elevation of the gun. The upper extremities of the carriage 2 have respective mounting holes 2c forming bearings for the cradle trunnions 32.

An important feature of the carriage is the fact that it is made from sheet metal stampings with several cut-out portions as shown. It has been found that a carriage made in this way is light and strong and at the same time is flexible. This flexibility adds much to the desirability of the described mount in that the flexibility tends to take up much of the recoil without materially detracting from the accuracy of the gun.

A preferred form of cradle is illustrated in Figures 4 and 5. The cradle comprises a base member 33 of U-shaped cross section with two transverse support members 34 and 35. Slidably mounted in said base member is a gun carrying member comprising a pair of front slide rods 36. The gun carrying member also comprises a rear slide 37, which is a simple stud shaft extended rearwardly from a rear gun support 38, the latter being in the form of a crosshead, in respective ends of which the rods 36 are set and extended forwardly in parallel relation to a front gun support 40. The front and rear gun supports 40 and 38 are provided with a pair of holes for the reception of front and rear transverse locking pins 42 and 41, respectively, adapted to fasten a machine gun to the gun carrying member. Attached to the front gun carrying member 40 is a recoil spring slide 43 which carries the recoil spring 44, compressed between transverse support member 35 and front gun support 40 and thus tending to resist the rearward movement of the gun carrying member. Mounted on the rear slide 37 is a counterrecoil spring 45 held in place by a collar 46. The counterrecoil spring 45 tends to retard the forward movement of the gun carrying member. It has been found preferable to make the recoil spring heavier than the counterrecoil spring. For instance, in one embodiment of the invention, it was found desirable to use a 180-pound recoil spring and a 120-pound counterrecoil spring. In this way a gun mounted on the carriage operates as a substantially fixed battery weapon, i. e., the gun returns to substantially the same position after each shot and does not vary in position when the carriage is inclined at various angles. In some types of operations, it may be desirable to have both springs of equal strength.

In many applications, it is possible to eliminate the recoil carriage and to substitute therefor a plain saddle to hold the gun, such as is well known in the prior art. The flexibility of the carriage portion of the mount is capable of taking up a large portion of the recoil energy, lessening the need for the recoil mechanism. This is particularly true when auxiliary means such as sandbags are used to hold the mount or when a muzzle brake is used on the gun.

One of the novel features of the invention is the inclined ammunition box holder 47. It will be noted that the ammunition box is inclined to the rear of the gun. It has been found that if the ammunition box is in this position the ammunition will not fall out of the box at high angles of elevation of the gun.

Extending rearwardly from the cradle 3 and upward vertically at a distance behind the receiver of the gun, there is a handle 48 with a terminal cross member 49. Mounted on the cross member 49 is the trigger actuating mechanism 50. The trigger actuating mechanism is illustrated in detail in Figure 6. The mechanism illustrated comprises two side members 51, rear member 52 and a top member 53. The trigger actuating device proper consists of a thumbpiece 54, a lever arm 55 and a shaft 56. Fixed on shaft 56 are a pair of parallel arms 57 which hold between their extremities a roller 58. Roller 58 is arranged so that it engages and depresses the gun trigger 59 when the thumbpiece 54 is moved towards cross member 49. The trigger mechanism is normally held in an inoperative position by means of a spring 60 which is fastened between an arm 61 and the top member 53, the arm 61 being rigidly secured, as by welding, to the shaft 56 for rocking with the shaft. A safety device is provided in the form of a straight toggle lever 62 of the first order, mounted on the rear plate member 52 with one arm extended below the level of the shaft 56 and adapted to engage behind a depending arm 63 fixed on shaft 56, and thus prevent the rotation of shaft 56 when pressure is applied to thumbpiece 54. A toggle action is provided by spring 64 which is fastened between the lower arm of toggle lever 62 and top member 53. The lever 62 has the extremity 62' of its upper arm projected rearwardly through an arcuate slot 62'' in the rear case member 52 as a finger piece, exposed for movement from "safe" position shown, to "fire" position or vice versa, the movements being limited at respective positions by engagement of the finger piece against the ends of the slot. The spring 64 swings across a dead center relation to the lower lever arm intermediately of the two positions, so as to hold the lever firmly in each position alternately, but, yieldable to manual pressure on the finger piece. Although the toggle lever is shown in the "safe" position it may be placed in the "fire" position by a single movement. This trigger mechanism is very handy for the gunner and gives good control of the gun. A further advantage of this structure is that the trigger actuating arm 57 readily adapts itself to small variations in the position of triggers on different guns. As illustrated in Figure 6 I have provided a supporting arm 65 depending from the top plate 53 and serving to strengthen and to provide an intermediate bearing for the shaft 56. In order to assemble the mechanism with the least difficulty one of the bearings in a side plate 51 for the shaft 56 is formed as an elongated slot and a securing plate or lug 66 is employed to provide a rigid assembly. I have likewise illustrated an adjustable stop 67 mounted in the end plate 52 for limiting the counterclockwise rotation of shaft 56 by engagement with the upper end of arm 61.

It will be apparent from the foregoing detailed description that many variations, modifications, and deviations from the specific embodiments disclosed will occur to one skilled in the art without departing from the spirit and scope of the present invention and I therefore intend to be limited only in accordance with the following claims.

I claim:

1. A tripod base for the carriage and cradle of a machine gun, said base comprising a central circular carriage supporting member and having three legs of substantially equal length, one of said legs being rigidly fixed to said central member and two of said legs being each mounted on a separate pivot fixed substantially perpendicular to said central member, the axis of each leg forming a large acute angle with the axis of each pivot, said legs being pivotable on said pivots from a position substantially parallel to said fixed leg into a position at a substantial angle therefrom and from each other, clamping means for fastening said pivoted legs in fixed relationship to said central member, said central circular carriage supporting member comprising an upper carriage holding element and a lower leg attachment both of said elements being dish-shaped with the upper element slightly larger and with the hollow faces of said dish-shaped elements toward each other whereby the edges of the dish-shaped elements overlap, a bearing between the said dish-shaped elements and at least two outwardly extending lugs fixed to said central member at predetermined various angles from said rigidly fixed leg, each lug being constructed to serve as a base for clamping one of said pivoted legs thereto whereby said pivoted legs may be positioned at various angles from said fixed leg.

2. The tripod base of claim 1 wherein said lugs are four in number, of which two are positioned to retain the three legs equally spaced from each other, the other two being positioned to retain the two pivoted legs when supported thereby so that each is substantially 140° from the fixed leg.

PHILIP P. GLASSEY.

REFERENCES CITED

The following references are of record in the file of this patent:

UNITED STATES PATENTS

| Number | Name | Date |
| --- | --- | --- |
| 381,475 | Koerner | Apr. 17, 1888 |
| 657,406 | Fouts | Sept. 4, 1900 |
| 911,544 | Roehlk | Feb. 2, 1909 |
| 986,482 | Messink | Mar. 14, 1911 |
| 1,012,738 | Sonnberg | Dec. 26, 1911 |
| 1,249,707 | Zimmerman | Dec. 11, 1917 |
| 1,285,765 | Martin | Nov. 26, 1918 |
| 1,383,658 | Olivier | July 5, 1921 |
| 1,643,491 | Green | Sept. 27, 1927 |
| 1,701,153 | Green | Feb. 5, 1929 |
| 1,735,164 | Green | Nov. 12, 1929 |
| 1,757,244 | Green | May 6, 1930 |
| 1,778,626 | De Boigne | Oct. 14, 1930 |
| 1,805,547 | Ironside | May 19, 1931 |
| 1,849,742 | Dugeid | Mar. 15, 1932 |
| 1,914,204 | Herold et al. | June 13, 1933 |
| 1,919,223 | Johnston | July 25, 1933 |
| 1,977,629 | Heavey | Oct. 23, 1934 |
| 2,003,327 | Woodberry | June 4, 1935 |
| 2,346,845 | Ironside | Apr. 18, 1944 |

FOREIGN PATENTS

| Number | Country | Date |
| --- | --- | --- |
| 106,224 | Great Britain | May 17, 1917 |
| 363,043 | Germany | Nov. 3, 1922 |
| 472,716 | Great Britain | Sept. 29, 1937 |